(12) United States Patent
Boon

(10) Patent No.: US 6,865,338 B1
(45) Date of Patent: Mar. 8, 2005

(54) METHOD OF ENCODING IMAGE INFORMATION, ITS ENCODER, ITS DECODING/COMPOSING METHOD, ITS DECODER/COMPOSER AND RECORDING MEDIUM ON WHICH THOSE METHODS ARE RECORDED

(75) Inventor: Choong Seng Boon, Moriguchi (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/214,556

(22) PCT Filed: Jun. 9, 1997

(86) PCT No.: PCT/JP97/01975

§ 371 (c)(1),
(2), (4) Date: Jan. 4, 1999

(87) PCT Pub. No.: WO98/02001

PCT Pub. Date: Jan. 15, 1998

(30) Foreign Application Priority Data

Jul. 3, 1996 (JP) .............................. 8-173263

(51) Int. Cl.[7] ................................ H04N 5/91
(52) U.S. Cl. .......................... 386/95; 386/98
(58) Field of Search ............................ 386/46, 95, 98, 386/111, 112, 120, 121, 125, 126; 348/564, 565

(56) References Cited

U.S. PATENT DOCUMENTS 5,621,840 A * 4/1997 Kawamura et al. ........... 386/68
5,793,872 A * 8/1998 Hirayama et al. ............. 386/95
5,926,230 A * 7/1999 Niijima et al. ............... 348/564

FOREIGN PATENT DOCUMENTS

| JP | 4-10884 | 1/1992 |
| JP | 6-98313 | 4/1994 |
| JP | 8-79742 | 3/1996 |

OTHER PUBLICATIONS

V. Michael Bove, Jr., "Object–Oriented Television", SMPTE JOURNAL, vol. 104, No. 12, pp. 803–807, Dec. 1995.

"Munich Meeting of MPEG–4 Working Group Report ISO/IEC JTC1/SC29/WG11 MPEG4/N1172" International Polymer Science and Technology.

Supplementary European Search Report corresponding to application No. EP 97 92 4363 dated Jun. 22, 1999.

M. Eido, "Trend in the movement MPEG4 of standardization of moving picture encoding", *Technical Research Report of IEICE*, vol. 95, No. 469, pp. 55–60, Jan. 18, 1996.

E. Kasuya et al., "Coding of image content and its application to edit processing function", *Technical Research Report of Information Processing Soc. Of Japan*, vol. 96, No. 17, pp. 29–36, Feb. 16, 1996.

(List continued on next page.)

*Primary Examiner*—Huy Nguyen
(74) *Attorney, Agent, or Firm*—RatnerPrestia

(57) ABSTRACT

When video signals are composed so that one video signal can be defined by (i) inputting plural video signals, (ii) attaching a picture identifier to the respective video signals for identifying the video signals, and (iii) composing some of the plural video signals, a picture coding method including the following processes is proposed. 1. Prepare composing information such as a composing sequence. 2. Encode at least the video signals having picture identifiers together with the composing information. A coding apparatus using this method, a picture decoding method that decodes the video signals coded with this method, a decoding apparatus using this decoding method are also proposed. A recording medium that records the data implementing the above methods is proposed.

7 Claims, 11 Drawing Sheets

OTHER PUBLICATIONS

H. Yasuda, "MPEG/International standard of Multimedia encoding", Maruzen (Toyko), pp. 148–171, 1994.

M. Eido, "Trend in standardization of MPEG4", *The Journal of the Inst. Of Image Electronics Engineers Of Japan*, vol. 25, No. 3, pp. 223–228, Jun. 25, 1996.

Japanese Search Report for Int'l Application No. PCT/JP97/01975 dated Sep. 9, 1997.

English language translation for Japanese search report.

ISO/IEC JTC1/SC29/WG11/N1246: "MSDL specification version 1.1", Mar. 1996, pp. 1–101.

* cited by examiner

<COMPOSITION TIME>{
  <H>{0},<M>{15},<S>{30};
};                                                           } 402

<COMPOSITION ORDER>{
  <OID>{2},<TR>{8},<CO>{0},<XPOS>{0},<YPOS>{0};//background
  <OID>{3},<TR>{5},<CO>{1},<XPOS>{0},<YPOS>{0};//middle
  <OID>{4},<TR>{8},<CO>{2},<XPOS>{0},<YPOS>{0};//foreground
};                                                           } 403

<BLENDING FILTER>{
  {0,1,0,
   1,4,1,
   0,1,0};
};                                                           } 404

<FRAME MEMORY MANAGEMENT>{
  <OID>{0},<FREE>{1};
};                                                           } 405
```

METHOD OF ENCODING IMAGE INFORMATION, ITS ENCODER, ITS DECODING/COMPOSING METHOD, ITS DECODER/COMPOSER AND RECORDING MEDIUM ON WHICH THOSE METHODS ARE RECORDED

DESCRIPTION

This Application is a U.S. National Phase Application of PCT International Application PCT/JP97/01975.

TECHNICAL FIELD

The present invention generally relates to coding and decoding video signals, and more particularly to a method of coding plural pieces of picture information, an encoder using the method, a method of decoding and composing the coded plural digital picture data, an apparatus using this method, and a recording medium that has recorded these methods as well as the data resulting from the execution of these methods.

PRIOR ART

Data compression (=encoding) is required for efficient storing and transmitting of a digital picture.

Several method of encoding are available as prior art such as "discrete cosine transform" (DCT) including JPEG and MPEG, and other wave-form encoding methods such as "sub-band", "wavelet", "fractal" and the like. Further, in order to remove redundant signals between pictures, a prediction method between pictures is employed, and then the differential signal is encoded by waveform encoding method.

Recently, a method of coding and decoding has been employed so that a coding efficiency can be improved as well as each object constituting a picture can be independently coded, transmitted, and decoded at a reproduction side that composes the individual decoded object into a picture for displaying it.

An advantage of this method is that objects can be arbitrary combined and composed thanks to an individual-object-coding method, whereby moving pictures can be re-edited with ease. This method also can save relatively unimportant objects from being reproduced depending on busyness of the transmission lines, capacity of the reproduction apparatus, or taste of users without negative influence to viewing the motion pictures. In other words, object-wise scalability is possible with this method.

In order to embody the above function, the composing of individual objects should be changed with ease. In the prior art, information necessary for composing objects is included in the coded data of each object. The information about composing objects includes the depth of an object, placement thereof, and visibility thereof and the like. When re-editing is required or an object is required to be flexible such as being scaled down/up, the coded data must be analyzed first, and then the data relevant to the composing information is changed because the composing information is included in the coded data of the object. Further, the present invention aims to provide a recording medium that has recorded the above methods and the data resulting from the execution of the above methods.

SUMMARY OF THE INVENTION

The present invention aims to provide a method of coding, a method of decoding and composing, as well as an apparatus using the same methods. With these methods and apparatus, composing information can be changed with ease, when each object constituting a picture is independently coded and transmitted to a receiver which composes the plural pieces of picture information. More specifically, the present invention aims to change the composing information with ease by saving the coded data from being analyzed.

A picture coding method of the present invention encodes video signals together with composing information through the following steps:

(1) input plural video signals;

(2) attach a picture identifier to the video signals individually for identifying each video signal;

(3) when some of the plural video signals are to be composed into one single video signal, prepare relevant composing information such as composing sequence; and (4) encode the video signals to which at least picture identifiers are attached and the composing information.

The present invention can provide a picture encoding apparatus that employs this method. The apparatus comprises the following elements:

(a) picture input means for inputting plural video signals;

(b) picture identifier attaching means for attaching a picture identifier to the plural video signals individually in order to identify each video signal;

(c) composing information preparation means for outputting the composing information in order to compose the plural video signals; and (d) coding means for encoding the composing information and the video signals having at least the picture identifiers.

Another coding method of the present invention encodes video signals and composing information through the following steps:

(1) divide one picture into plural objects in order to form plural portions of the picture, whereby a single video signal is divided into plural video portion signals;

(2) attach a picture identifier to the video portion signals individually for identifying each video portion signal;

(3) prepare composing information including composing sequence so that the video portion signals are composed into one single video signal; and (4) encode the video portion signals having at least picture identifiers, and encode the composing information.

The present invention can also provide a picture coding apparatus that employs the above method. The apparatus comprises the following elements so that one single video signal can be formed with plural pictures by composing:

(a) picture division means for dividing a video signal into plural video portion signals;

(b) picture identifier attaching means for attaching a picture identifier to the video portion signals individually for identifying each video portion signal;

(c) composing information preparation means for outputting composing information in order to form a single video signal by composing the plural video portion signals; and (d) coding means for encoding at least the composing information the video portion signals having the picture identifiers.

A decoding and composing method that can decode and compose the coded video signal undergone the above process comprises the following steps:

(1') receive plural coded data;

(2') decode the plural coded data;

(3') extract the picture identifiers attached to the coded data.

On the other hand, the composing information is received, and plural coded data are decoded based on this information and the picture identifiers, then finally one decoded picture is obtained.

The present invention provides a picture decoding and composing apparatus that employs the above method and comprises the following elements.

(a') receiving means for receiving plural coded data;

(b') decoding means for decoding the coded data received by the receiving means;

(c') picture identifier extraction means for extracting the picture identifiers attached to the coded data that are to be decoded by the decoding means;

(d') composing information receiving means for receiving the composing information that is utilized to compose the plural coded data; and, (e') composing means for composing the plural coded data based on at least the picture identifiers and the composing information.

The composing information includes at least a composing sequence and picture identifiers of the object pictures to be composed. According to the composing sequence, a depth and location designated by the picture identifier of a portion picture are determined, whereby plural reproduced portion pictures are composed. The picture decoding and composing apparatus further comprises input means, through which only the composing information independent of the coded data is modified, and then the reproduced portion pictures are composed according to the modified composing information.

As described above, when elements, such as objects in a picture, defining the picture are coded and transmitted independently for composing each element into a picture, the composing information can be changed with ease and can be flexibly as well as arbitrarily composed. Also when plural video portion signals are coded and transmitted for composing these plural signals into a new picture, the composing information can be changed readily and flexibly as well as arbitrarily composed. As a result, interactive performance is noticeably improved.

BRIEF DESCRIPTION OF THE DRAWINGS

FIG. 3(A) illustrates first coded picture data. FIG. 3(B) shows multiplexed data of packetized first and second coded picture data. FIG. 3(C) shows second coded picture data.

FIG. 4 depicts a content example of the composing information used in the exemplary embodiment of the present invention.

DETAILED DESCRIPTION OF EXEMPLARY EMBODIMENTS

Exemplary Embodiment 1

Figure 1:
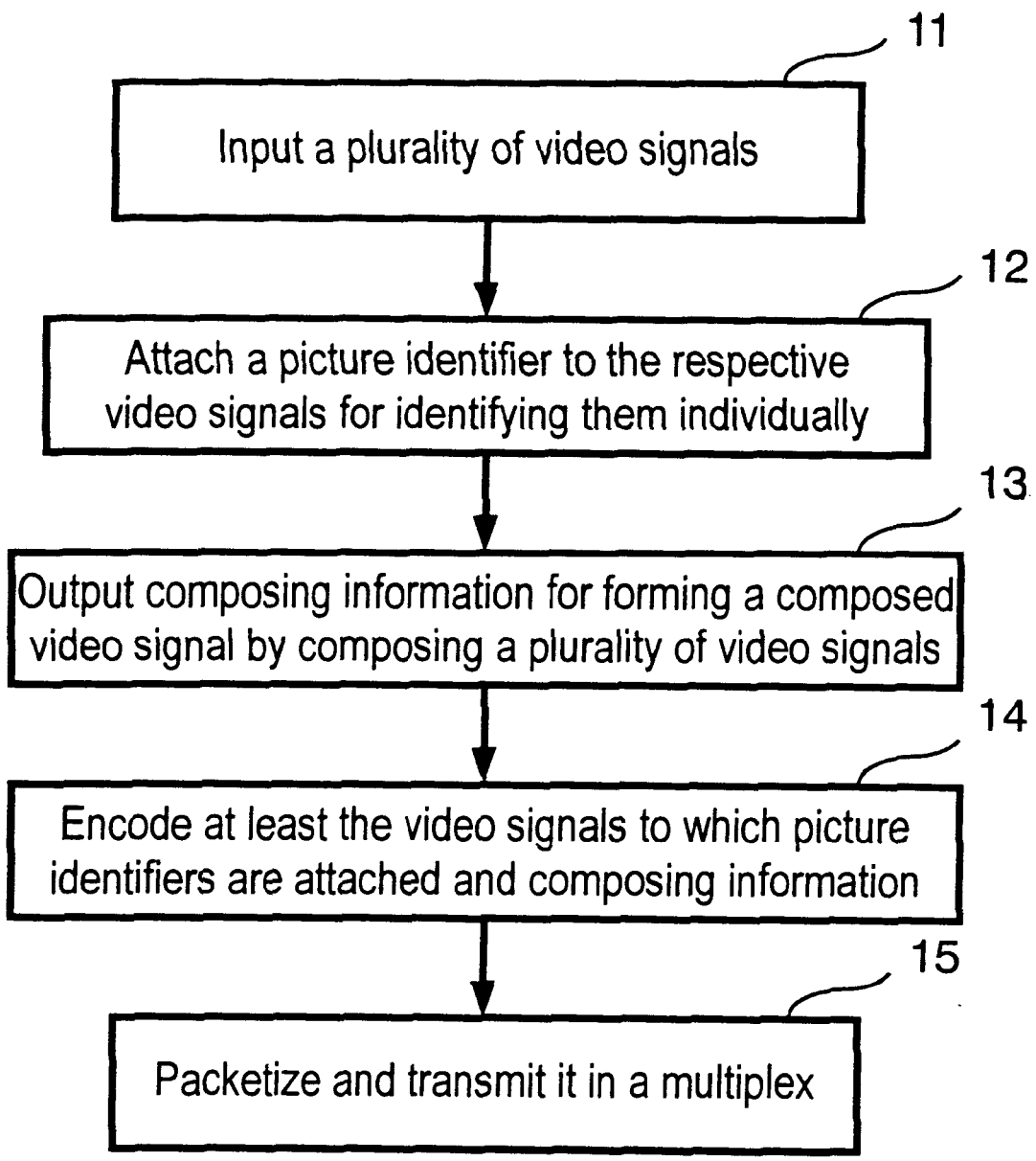
FIG. 1 is a flowchart depicting a method of coding plural video signals in a first exemplary embodiment of the present invention.
Figure 3:
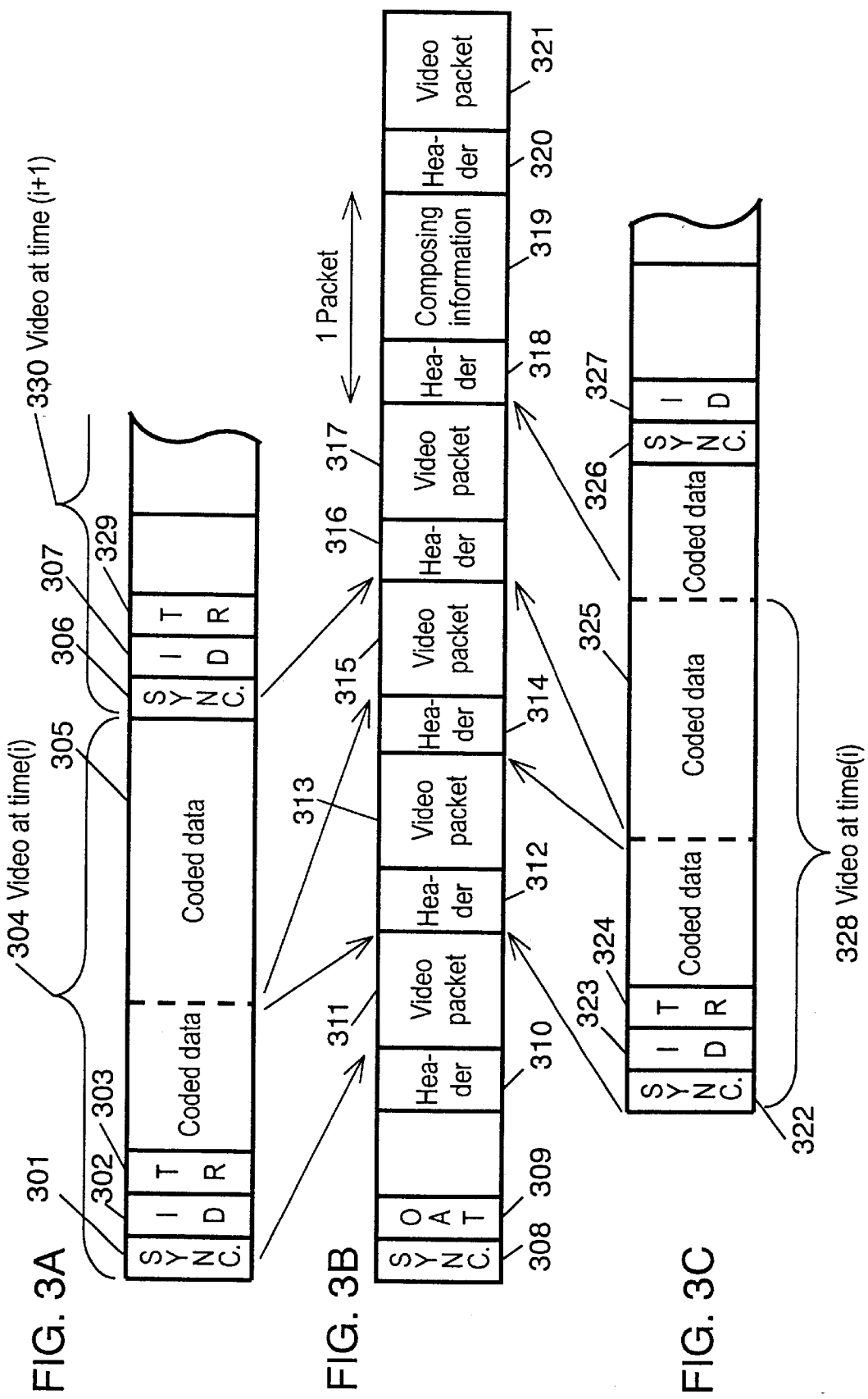
FIG. 3 illustrates structures of coded picture data and the picture data to be decoded.

The first exemplary embodiment is described with reference to FIGS. 1, 3 and 4. FIG. 1 is a flowchart depicting a method of coding plural video signals in a first exemplary embodiment of the present invention. FIG. 3 illustrates a bit-stream data-structure of the resultant digitally coded plural video signals. FIG. 4 shows a description example of the data.

In FIG. 1, input a plurality of video signals on Step 11. The plural video signals will be detailed later with reference to FIGS. 3(A) and 3(C). On Step 12, attach a picture identifier to each input video signal to be identified. In FIG. 3(A), an identifier (ID) 302 is attached to picture data 304 having time (i). In FIG. 3(C), an identifier (ID) 323 is attached to picture data 328 having time (i).

On Step 13 in FIG. 1, output the composing information for forming a composed video signal by composing plural video signals. FIG. 3(B) illustrates multiplexed data of packetized coded picture data shown in FIGS. 3(A) and 3(C). The composing information packet 319 is the one supplied on Step 13.

On Step 14, encode the video signals at least having the picture identifier, and the composing information. The resultant coded video signals are 304 and 330 to which identifiers (ID) 302 and 307 as well as time identifiers (TR) 303 and 329 are respectively attached. Another resultant coded video signal is 328 that has identifiers (ID) 323, 327 and time identifier (TR) 324.

On Step 15 in FIG. 1, packetize and then transmit in multiplex the coded video signals shown in FIGS. 3(A) and 3(C). The packetized form is shown in FIG. 3(B). In this case, a packet 319 is independently provided for containing the composing information, while video packets 311 and 315 are provided for the video signals. A composition parameter is described in this packet 319 and transmitted, the parameter tells how to compose and output the video signals shown in FIGS. 3(A) and 3(C).

FIG. 4 shows an example of the above case, and composing information 401 is depicted. A composition time 402 records the time when the video signals are composed. A composition order (composing sequence) 403 includes picture identifiers (OID), time identifiers (TR), depth (CO) and placement (XPOS, YPOS). Composing information for blending filter is represented with 404, a frame memory management is represented with 405.

In this case, a composing sequence is listed as part of composing information. When plural pictures to be composed differ in size, a coordinates converting parameter can be listed so that compositions rich with variety by changing the composing information can be achieved with ease.

Figure 10:
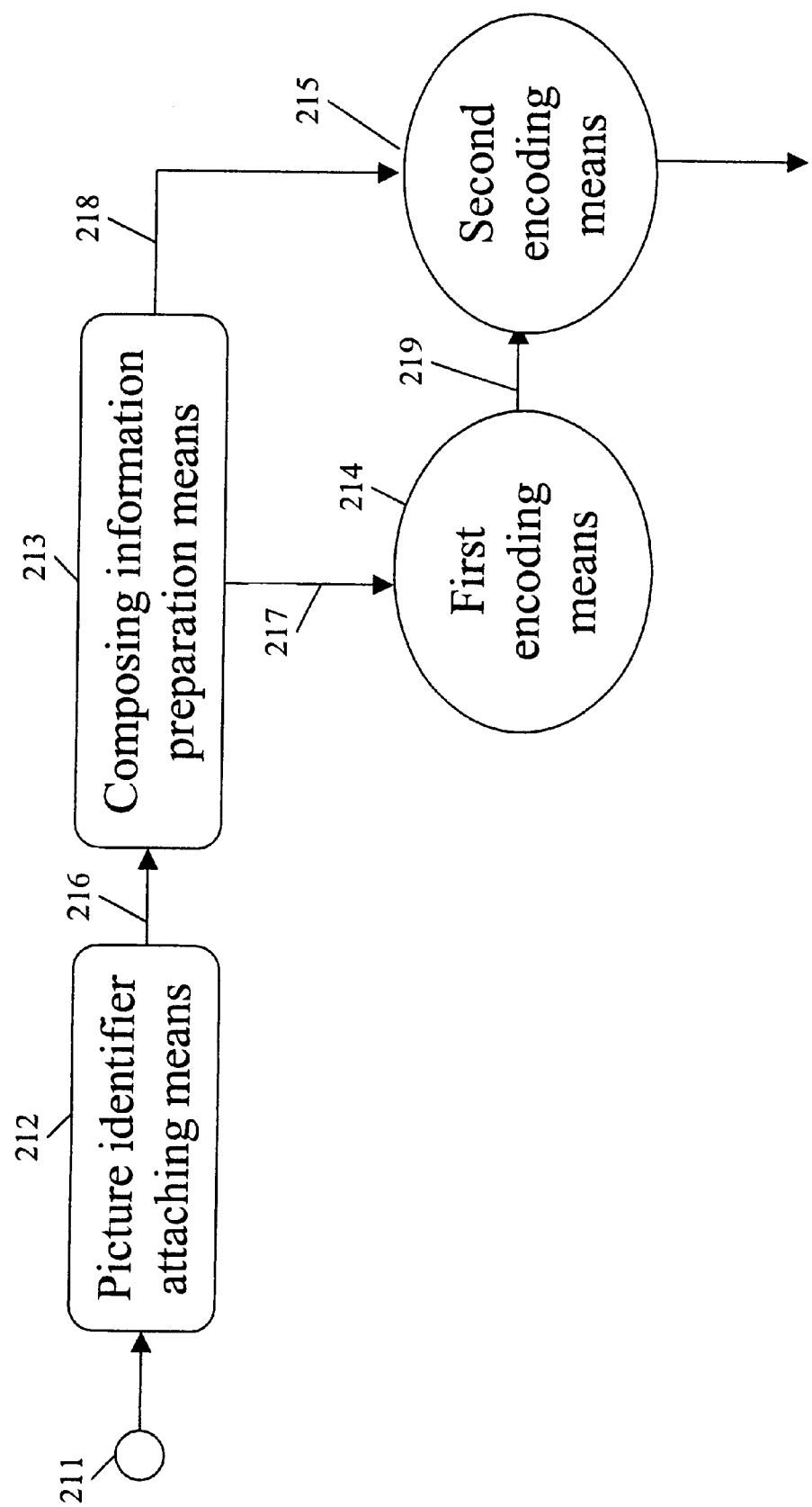
FIG. 10 illustrates a picture coding apparatus employing the method shown in FIG. 1.

FIG. 10 includes the following elements: input terminal 211, picture identifier attaching means 212, composing information preparation means 213, first encoding means 214 and second encoding means 215.

Operation of the picture coding apparatus of FIG. 10 is as follows:

(1) Input a plurality of video signals to input terminal 211 (Step 11 in FIG. 1)

(2) Attach a picture identifier to each input video signal for identification in picture identifier attaching means 212 (Step 12 in FIG. 1)

(3) Send the input video signal with the picture identifiers to composing information preparation means 213 via a line 216, and output the composing information for forming a composed video signal by composing a plurality of video signals (Step 13 in FIG. 1)

(4) Send the video signals which at least have the picture identifier and the composing information, to the first encoder 214 via a line 217, and encode the video signals with the identifier (ID) as well as the time identifier (TR) by the first encoder 214 (Step 14 in FIG. 1)

(5) Encode the composing information, passing through line 218, with the first encoded video signals, passing through line 219, by the second encoder 215 to form the transmitting signals (Step 15 in FIG. 1).

Exemplary Embodiment 2

Figure 2:
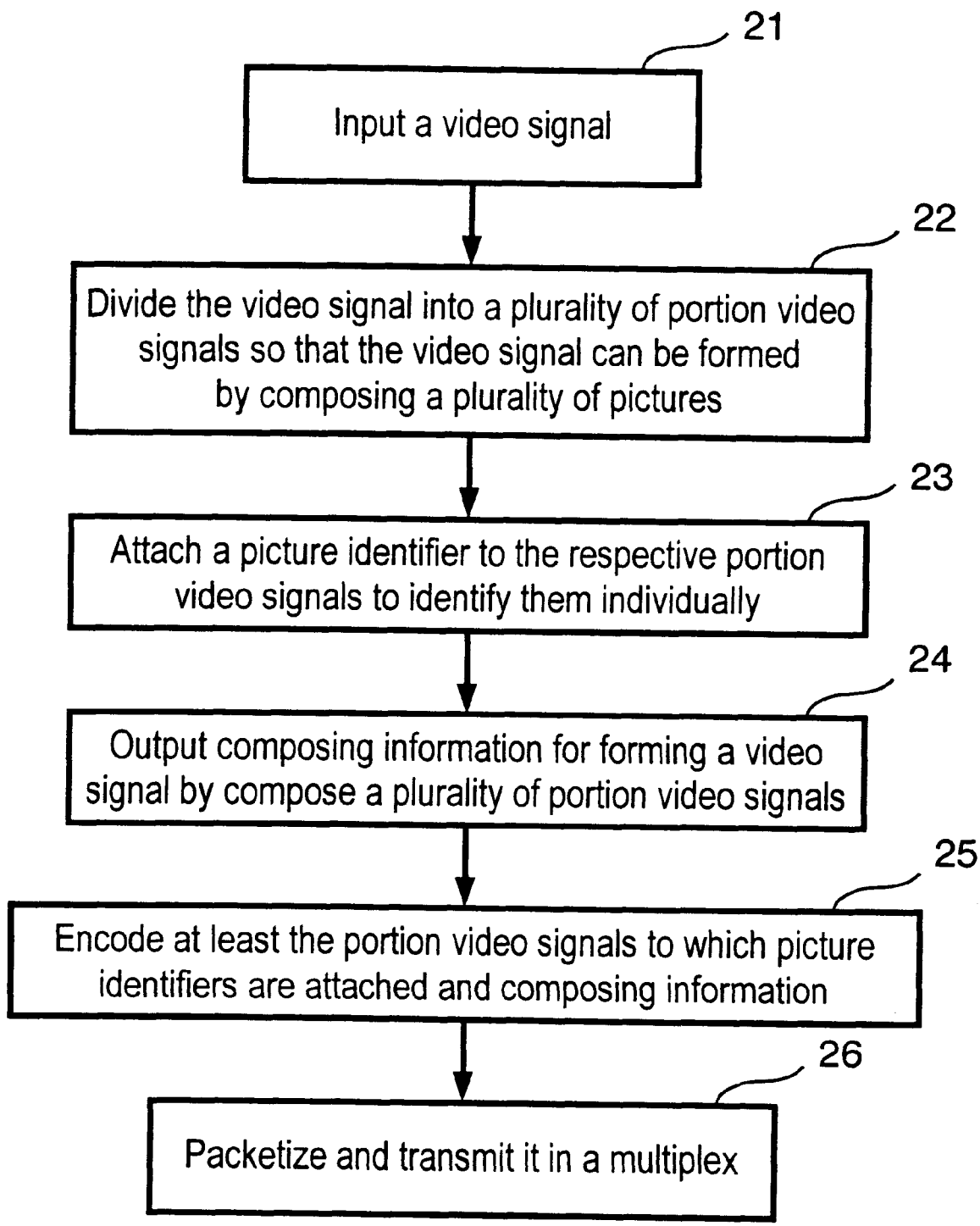
FIG. 2 is a flowchart depicting a method of coding plural video signals in a second exemplary embodiment of the present invention.

The second exemplary embodiment is described with reference to FIGS. 2, 3 and 4. FIG. 2 is a flowchart depicting a method of coding plural video signals in a second exemplary embodiment of the present invention. There are several different points from FIG. 1. First, a work is added, i.e. input a picture, and divide it into plural portion pictures. FIG. 3 shows a bit-stream data structure resulting from coding digitally the plural portion pictures. This is the same as described in the first exemplary embodiment. FIG. 4 shows also the same operation steps as the first exemplary embodiment, and provides an example of data description.

On Step 21 in FIG. 2, input video signals to be coded, and on Step 22 divide the video signals into plural portion pictures with a method that divides a picture into elements such as objects and backgrounds within the picture.

Regarding Step 23 to Step 26, the same operation as in FIG. 1 except substituting the portion video signals for the video signal. One video signal is divided into plural portion video signals and composing information, and the coded picture data thereof are supplied in the form of bit-stream having the structure shown in FIG. 3(B).

Through these steps, one picture can be accurately transmitted, and also the picture can be edited with ease by re-writing the composing information at decoding operation.

Figure 11:
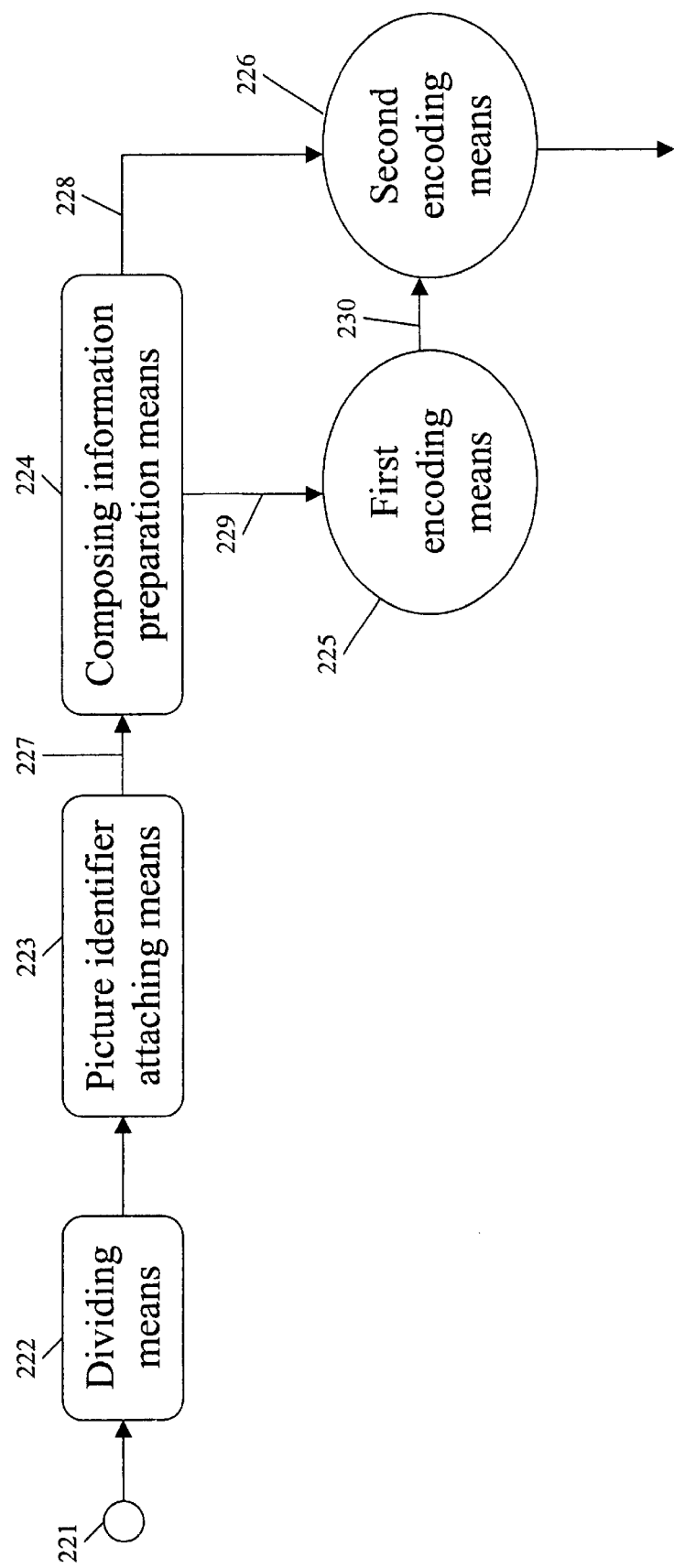
FIG. 11 illustrates a picture coding apparatus employing the method shown in FIG. 2.

FIG. 11 includes the following elements: input terminal 221, dividing means 222, picture identifier attaching means 223, composing information preparation means 224, first encoding means 225 and second encoding means 226.

Operation of the picture coding apparatus constructed as above is similar to that of the apparatus described in FIG. 10, except for dividing the input signal into plural portion video signals in the dividing means 222 before feeding them into picture identifier attaching means 223 (Step 22 in FIG. 2). Therefore, picture identifier attaching means 223 has a portion of the video signals as an input, rather than the video signals-as shown with respect to FIG. 10.

Exemplary Embodiment 3

Figure 5:
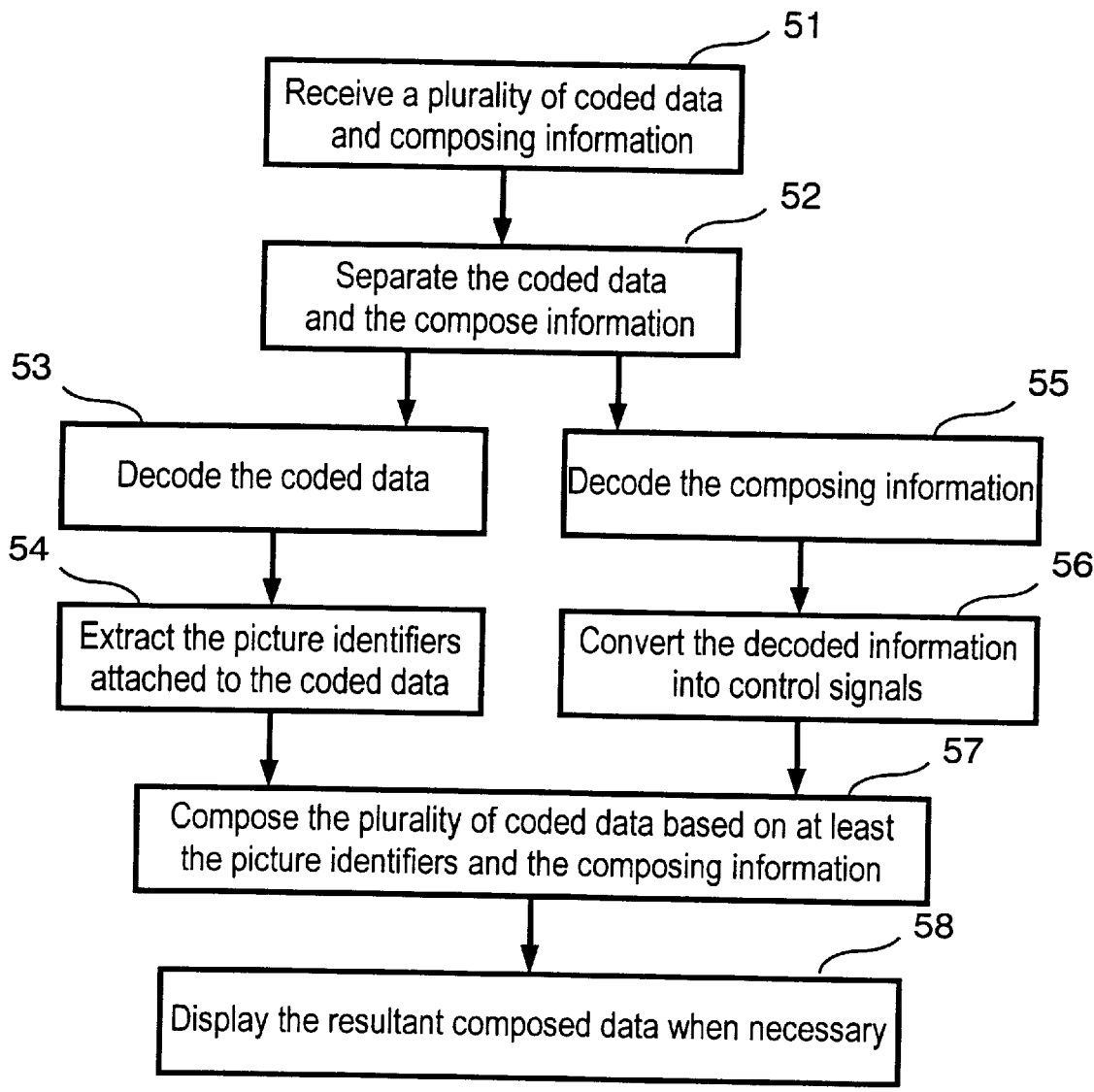
FIG. 5 is a flowchart depicting a method of decoding the multiplexed data of plural video signals utilized in a third exemplary embodiment.
Figure 6:
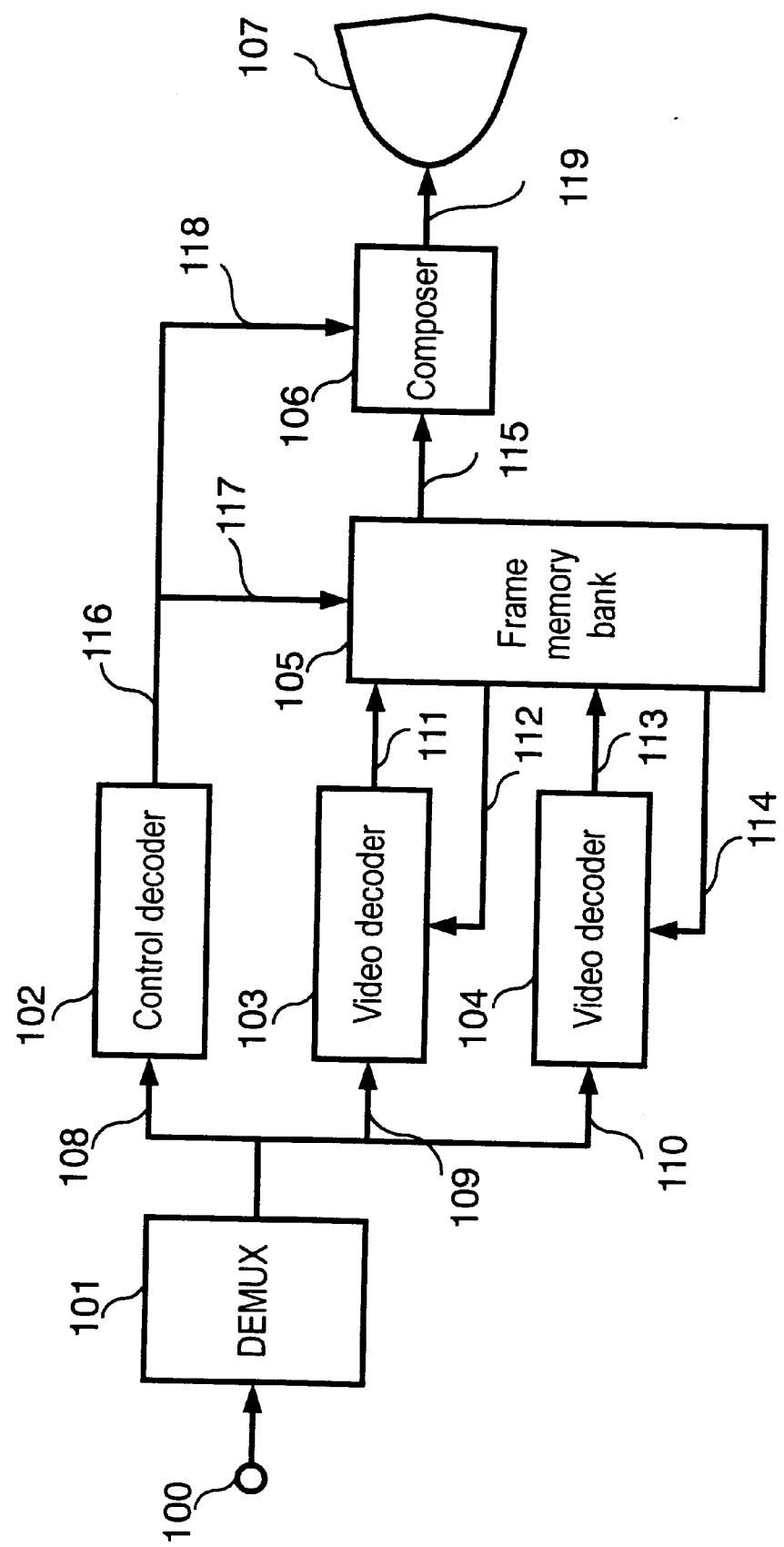
FIG. 6 is a block diagram illustrating a decoding and composing apparatus utilized in the third exemplary embodiment of the present invention.
Figure 7:
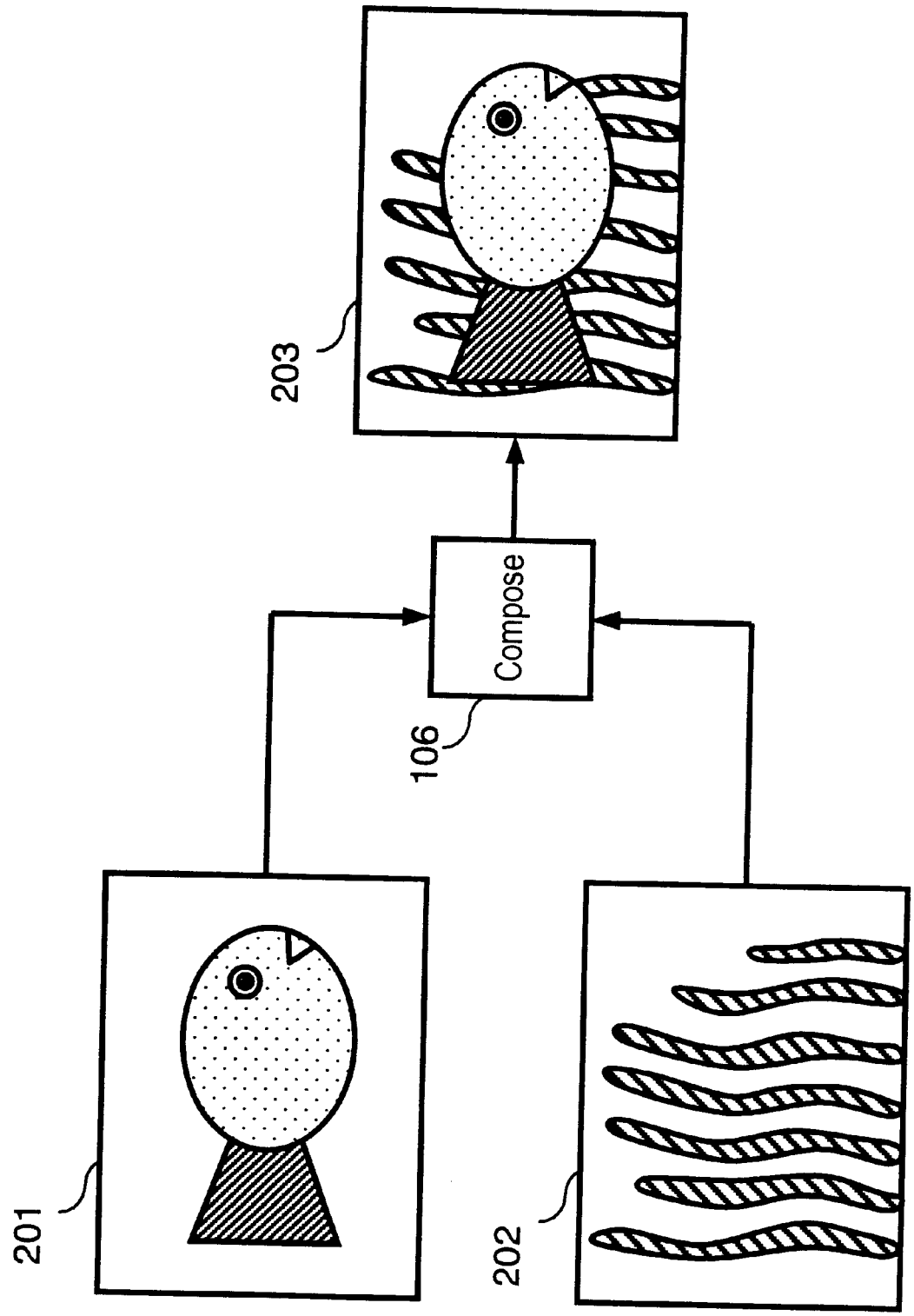
FIG. 7 is a schematic chart illustrating an example of composing plural video signals, where each object is composed.

FIG. 5 is a flowchart depicting decoding and composing in the third exemplary embodiment. FIG. 6 illustrates a decoding and composing apparatus employing the method shown in FIG. 5. FIG. 7 illustrates schematically how the two pictures are composed. An operation of the apparatus shown in FIG. 6 is described with reference to FIGS. 5 and 7.

FIG. 6 lists the following elements: input terminal 100, separator 101, control decoder 102, video decoders 103 and 104, frame memory bank 105, composer 106, and display unit 107.

An operation of the picture decoder and composer constructed as above is described hereinafter.

(1) Input received picture data and composing information to the input terminal 100 (Step 51 in FIG. 5.)

(2) Send the composing information to the control decoder 102 using the separator 101 via a line 108, and convert the information into a control signal (Steps 52, 55 and 56.)

(3) Input the coded picture data to the video decoders 103 and 104 (Step 53.) Two video decoders are prepared in this exemplary embodiment in order to make the description simple; however, arbitrary numbers of video decoders can be provided.

(4) Decode the coded picture data in the video decoders 103 and 104, and reproduce different pictures, then store them in the frame memory bank 105 (Steps 53 and 54.) The video decoders utilized in this exemplary embodiment employ "inter-frame motion compensation" and "discrete cosine transformation" that are typical functions of MPEG 1; however, the video decoder embodying the present invention is not limited to this type.

(5) Based on a control signal sent from the control decoder 102 via a line 117, access the object reproduced pictures for composing in the frame memory bank 105, and send the subject pictures to the composer 106 via a line 118.

(6) In the composer 106, compose the reproduced pictures sent via a line 115 following the control signal sent via the line 118 (Step 57.)

(7) Output the composed picture on the display 107 when necessary (Step 58.)

The above operation is described with reference to the specific pictures in FIG. 7. A first reproduced picture 201 has been reproduced by the video decoder 103. A second reproduced picture 202 has been reproduced by the video decoder 104.

The first reproduced picture 201 and the second reproduced picture 202 are composed in the composer 106 into a picture 203. The control signal sent via the line 118 in FIG. 6 assigns the first picture 201 a front view, and the second picture 202 a background.

The operation is further detailed with reference to FIG. 3 used in the first and second exemplary embodiments. A first coded picture data shown in FIG. 3(A) and a second coded picture data in FIG. 3(C) are composed.

The picture data 304 having time (i) is headed by a sync. signal 301 followed by the identifier (ID) 302, time identifier (TR) 303, and coding data in this sequence. The identifier (ID) and the time identifier (TR) are indicated in 5 bits and 16 bits respectively.

The picture data 330 having time (i+1) is also headed by a sync. signal 306 followed by the identifier (ID) 307, the time identifier (TR) 329, and coded data. Because FIG. 3(A) contains coded data in a same picture family, all the identifiers (ID) are the same; however, because the time identifiers (TR) depend on display times, they take different values.

The data structure of the second coded picture shown in FIG. 3(C) is the same that in FIG. 3(A); however, the identifiers used in FIG. 3(C) take different values from those in FIG. 3(A) to distinguish themselves from each other.

The data shown in FIG. 3(B) are produced through packetizing and multiplexing the picture data. The first coded picture data shown in FIG. 3(A) and the second coded picture data in FIG. 3(C) are separated into plural packets before being multiplexed. For instance, the picture 304 having time (i) is separated into video packets 311 and 315, the picture 328 having time (i) is separated into video packets 313 and 317, and then, they are multiplexed. Headers 310, 312, 314 and 316 are attached to respective packets. These headers include a packet identifier that is written in 6 bits fixed-length code. Different packet identifiers are attached in order to distinguish the first coded picture data from the second coded picture data. The composing information is also packetized into a composing information packet 319, and then multiplexed. The packet 319 also has a header to which a packet identifier different from that of video packets is attached. In a packet identifier list (OAT) 309 lists the packet identifiers of the composing information packets and the packet identifiers of the packets containing the subject pictures to be composed.

The multiplexed data shown in FIG. 3(B) is to be received (Step 51 in FIG. 5.) By referring to the packet identifier list, the separator (demultiplexer) 101 in FIG. 6 sorts out video packets and composing information packets, where each packet has a packet identifier. Then restore the selected video packets to coded picture data, and input them into the video decoders 103 and 104 (Step 52.)

On the other hand, the composing information packet is restored to the composing information and sent to the control decoder 102, where the composing information is analyzed and converted into control information (Steps 55, 56.) The control decoder in this exemplary embodiment is a script interpreter, which analyzes the script of composing information as follows:

FIG. 4 depicts the composing information 401, where composition time 402, composing sequence 403, information for blending filter 404 and frame memory control information 405 are listed. The composing information defined as above is utilized as follows for composing a picture.

The composition time 402 indicates the time when a picture is composed with hour, minute and second. When the time comes in accordance with the timer of the apparatus, the picture is composed and displayed according to the composing sequence 403 and the information for blending filter 404. The composing sequence 403 includes picture identifiers (OID), time identifiers (TR), depth (CO), placement (XPOS, YPOS). When the composition time comes, the picture designated by the picture identifier and time identifier is accessed in the frame memory bank 105 to be read out, and the picture is composed following the depth and placement of the relevant picture.

In this exemplary embodiment, "CO=0" indicates the deepest background of the picture, "CO=1" indicates a front picture next to the background "0", and "CO=2" indicates further front picture to the layers of "CO=1" and "CO=0". The placement indicates the picture position on the coordinates in the displaying area. In this exemplary embodiment, "(0, 0)" indicates a center of the displaying area.

The information for blending filter 404 includes a coefficient of a filter that filters boundaries of the composed picture. In this exemplary embodiment, the coefficient of filter is 3×3. The frame memory control information 405 controls the opening and securing of the frame memory bank 105 in FIG. 6. In this exemplary embodiment, a picture having a picture identifier {0} releases the occupied memory.

Figure 8:
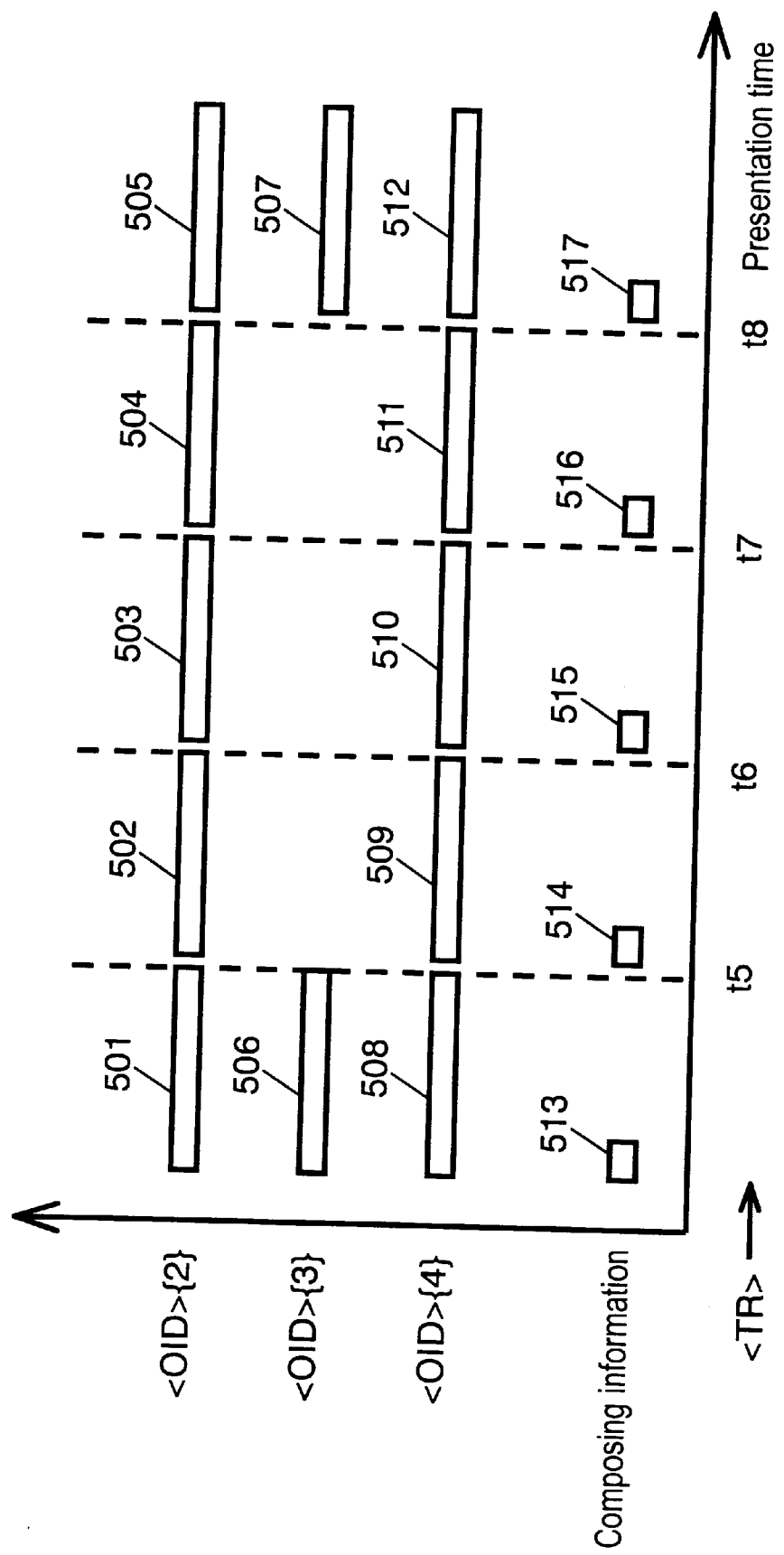
FIG. 8 is a timing chart of composing and displaying a picture, which illustrates the decoding operation in the exemplary embodiment of the present invention.

The timing with which a picture is composed and displayed is described hereinafter with reference to the composing information in FIG. 4. FIG. 8 illustrates part of the timing. The X axis indicates a display time of the composed picture. The composing information is indicated from 513 to 517. A picture having a picture identifier 2 (<OID>{2}) is indicated from 501 to 505. A picture having an identifier 3 (<OID>{3}) is indicated in 506 and 507. A picture having an identifier 4 (<OID>{4}) is indicated from 508 to 512.

At the time "t5", the pictures 501, 506, 508 and the composing information 513 are available, and according to the information 513, a picture is composed and displayed. When the picture 508 cannot be received or reproduced due to the business of the transmission line or limited capability of the apparatus, only the pictures 501 and 506 are composed. At the time "t8", the pictures 504, 511 and the composing information 516 are available, but the picture having the picture identifier 3 is not available. The information 516 in this case is depicted in FIG. 4, and the time identifier of the picture having the identifier 3 is indicated "5" (i.e. <OID>{3}, <TR>{5} of the composing sequence 403 in FIG. 4.) In other words, at the time "t8", it is enough to compose the pictures 504, 506 and 511. When a picture of which time identifier is designated is unavailable, a picture having a time identifier prior to this one can be used for composing. For instance, if the picture 511 having the identifier 4 and time identifier 8 is not available, the picture 510 replaces the picture 511 and is used for composing. At the time "t6" and "t7", the same process is necessary.

The time chart in FIG. 8 represents the case where composing information is continually received. When the composing information is not continually received, the composing information most recently received is utilized for composing until the information is updated. For example, the composing information 514, 515, and 516 are not received, the information 513 is kept using for composing pictures until the information 517 is received. In this case, the time identifier attached to the information 513 is replaced with those attached to each reproduced picture when composing is practiced.

The information for blending filter 404 and the frame memory control information 405 are not always included in the composing information 401. The picture placement information and time identifier are also not always included in the composing sequence 403. When the time identifier is not always included, pictures to be composed can be identified with the time identifier attached to each reproduced picture. The composing information can include data other than the above.

A decoding process and a composing apparatus are described with regard to pictures, the same process and apparatus can be applicable when audio signals are composed.

Exemplary Embodiment 4

Figure 9:
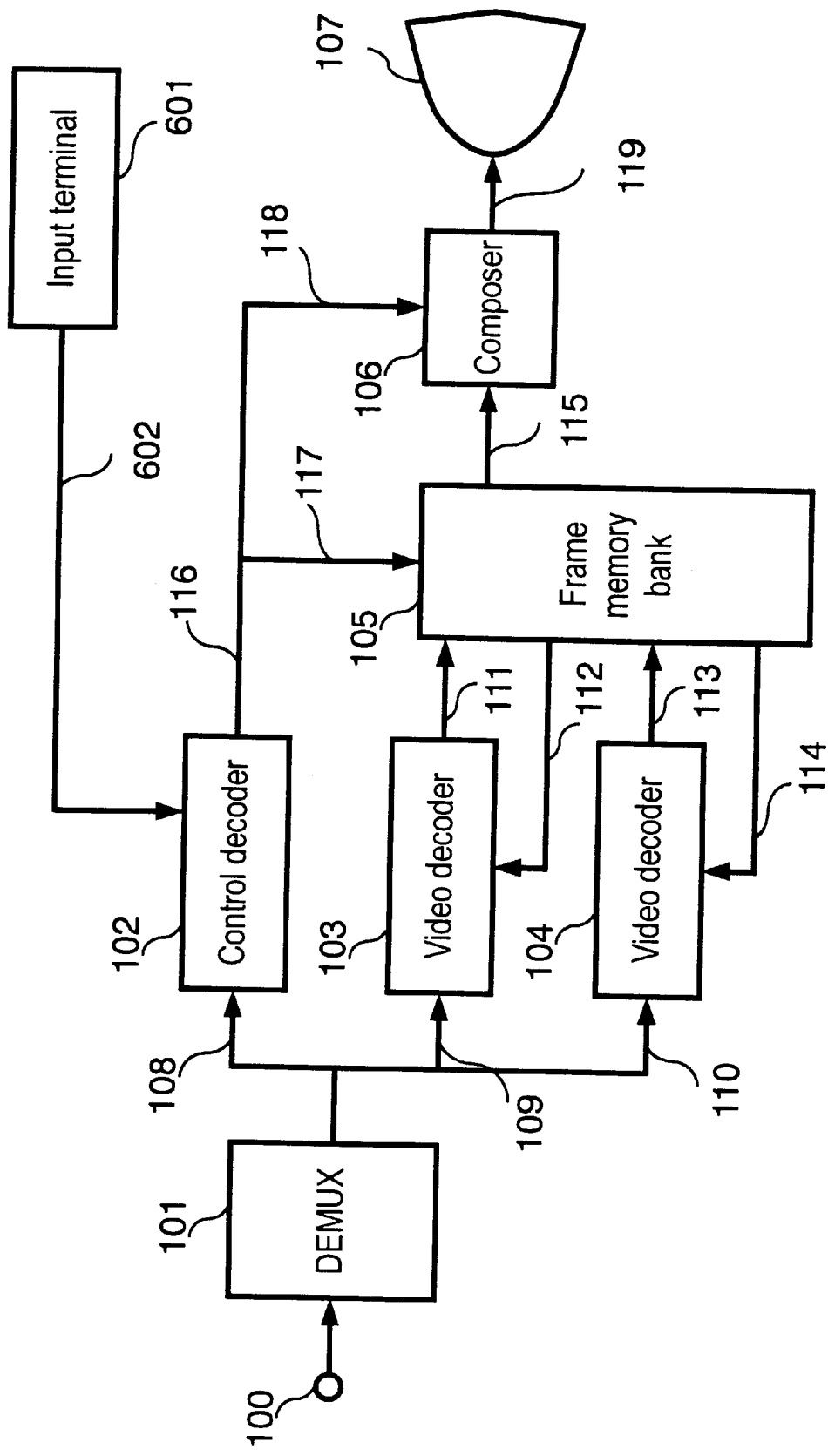
FIG. 9 is a block diagram illustrating a decoding and composing apparatus utilized in a fourth exemplary embodiment of the present invention.

FIG. 9 is a block diagram illustrating a decoding and composing apparatus utilized in a fourth exemplary embodiment of the present invention. The structure and the basic operation are the same as those in FIG. 6. An input terminal 601 is added to the structure shown in FIG. 6. A remote controller or a keyboard can be used as the input terminal 601. Part of the composing information is changed via the input terminal 601. For instance, data of depth out of the composing sequence 403 is changed so that the background can replace the front view.

Exemplary Embodiment 5

The coding method and decoding method described in the first, second and third exemplary embodiments can be recorded in a recording medium. The data resulting from executing the methods disclosed in the first and second exemplary embodiments can be also recorded in a recording medium.

Industrial Applicability

When elements, such as objects in a picture, defining the picture are coded and transmitted independently for composing each element into a picture, and also when plural video signals are coded and transmitted for composing these signals into a new picture, the present invention provides the composing information that tells how to compose the plural video signals. The composing information is transmitted together with the video signals so that the information can be changed with ease at decoding, and the new picture can be flexibly and arbitrarily composed. As a result, a noticeable advantage can be obtained such that interactive performance satisfying both sender and receiver can be practiced in editing.

What is claimed is:

1. A method of coding a picture comprising the steps of:
   (a) inputting a plurality of video signals, each of said plurality of video signals representing an elemental portion of said picture;
   (b) attaching respective picture identifiers to said plurality of video signals for identifying said video signals;
   (c) outputting composing information for defining one of said plurality of video signals by composing said plurality of video signals, said composing information including at least layout information and depth information for locating said elemental portion in said picture;
   (d) encoding said video signal to which at least said identifier is attached;
   (e) encoding said composing information independently from said video signals; and
   (f) packetizing and multiplexing said encoded video signals and said independently encoded composing information into respective packet signals.

2. An apparatus for coding a picture comprising:
   (a) input means for inputting a plurality of video signals, each of said plurality of video signals representing an elemental portion of said picture;
   (b) picture identifier attaching means for attaching a respective picture identifier to said video signals for identifying thereof;
   (c) composing information preparation means for outputting composing information that is used for composing said plurality of video signals, said composing information including at least layout information and depth information for locating said elemental portion in said picture;
   (d) first encoding means for encoding said video signal to which at least said picture identifier is attached; and
   (e) second encoding means for encoding said composing information independently from said video signals.

3. A method of encoding a picture wherein a video signal is composed with a plurality of pictures, said method comprising the steps of:
   (a) dividing a video signal into a plurality of video signals, each of said plurality of video signals representing a portion of said picture;
   (b) attaching a respective picture identifier to said plurality of video signals for identifying said video signals;
   (c) outputting composing information that is utilized for defining said video signal by composing said plurality of video signals, said composing information including at least layout information and depth information for locating said video signal in said picture;
   (d) encoding said video signals to which at least said picture identifier is attached;
   (e) encoding said composing information independently from said video signals; and
   (f) packetizing and multiplexing said encoded video signals and said independently encoded composing information into respective packet signals.

4. A picture coding apparatus that composes a video signal having a plurality of pictures, said apparatus comprising:
   (a) dividing means for dividing said video signal into a plurality of video signals;
   (b) picture identifier attaching means for attaching a respective picture identifier to said plurality of video signals for identifying said plurality of video signals;
   (c) composing information preparation means for outputting composing information to define said video signal by composing said plurality of video signals, said composing information including at least layout information and depth information for locating said plurality of video signals in said picture;
   (d) first encoding means for encoding said plurality of video signals to which at least said picture identifier is attached; and
   (e) second encoding means for encoding said composing information independently from said video signals.

5. A method of decoding and composing a picture comprising the steps of:
   (a) receiving a plurality of coded data representing a plurality of video signals;
   (b) decoding said coded data;
   (c) extracting a respective picture identifier attached to said coded data for said plurality of video signals;
   (d) receiving independently coded composing information that is utilized for composing said plurality of coded data, said composing information including at least layout information and depth information;
   (e) decoding said independently coded composing information, including said layout information; and
   (f) composing said plurality of coded data based on at least said picture identifiers, said decoded composing information and said layout information.

6. A picture decoding and composing apparatus comprising:
   (a) receiving means for receiving a plurality of coded data representing a plurality of video signals;
   (b) decoding means for decoding said received plurality of coded data;
   (c) picture identifier extracting means for extracting a respective picture identifier attached to said coded data to be decoded for said plurality of video signals;
   (d) coded composing information receiving means for receiving independently coded composing information that is utilized for composing said plurality of coded data, said composing information Including at least layout information and depth information;
   (e) coded composing information decoding means for decoding said independently coded composing information, including said layout information; and
   (f) composing means for composing said plurality of coded data based on at least said picture identifier, said decoded composing information and said layout information.

7. A method of encoding a picture according to claim 3, wherein recording of steps (a)–(f) in a recording medium is executed.

* * * * *